United States Patent
Wiese

(10) Patent No.: US 9,738,850 B1
(45) Date of Patent: Aug. 22, 2017

(54) USE OF ALKOXYLATED MONO- AND DIGLYCERIDES FOR CORN OIL RECOVERY

(71) Applicant: Ivanhoe Industries, Inc., Mundelien, IL (US)

(72) Inventor: Robert Wiese, Mundelien, IL (US)

(73) Assignee: Ivanhoe Industries, Mundelein, IL (US)

( * ) Notice: Subject to any disclaimer, the term of this patent is extended or adjusted under 35 U.S.C. 154(b) by 0 days.

(21) Appl. No.: 15/095,725

(22) Filed: Apr. 11, 2016

(51) Int. Cl.
  C11B 1/10 (2006.01)
  C11B 13/00 (2006.01)
(52) U.S. Cl.
  CPC ............. C11B 1/10 (2013.01); C11B 13/00 (2013.01)
(58) Field of Classification Search
  CPC ............ C11B 1/10; C11B 13/00; C11B 3/006
  See application file for complete search history.

(56) References Cited

U.S. PATENT DOCUMENTS

| | | | |
|---|---|---|---|
| 2,380,166 A | 7/1945 | Griffin | |
| 2,544,725 A | 3/1951 | Rider et al. | |
| 3,332,486 A | 7/1967 | McGhee | |
| 3,433,645 A | 3/1969 | Egan et al. | |
| 3,752,770 A | 8/1973 | Buddemeyer | |
| 4,808,426 A | 2/1989 | Strop et al. | |
| 4,929,361 A | 5/1990 | Polizzotti | |
| 5,283,322 A | 2/1994 | Martin et al. | |
| 5,408,924 A | 4/1995 | Arendt et al. | |
| 5,932,018 A | 8/1999 | Palardy | |
| 6,083,998 A | 7/2000 | Romualdo et al. | |
| 7,497,955 B2 | 3/2009 | Scheimann et al. | |
| 7,767,836 B2 | 8/2010 | Cheryan | |
| 7,794,548 B2 | 9/2010 | Teeter | |
| 7,893,115 B2 | 2/2011 | Cheng et al. | |
| 8,168,037 B2 | 5/2012 | Winsness | |
| 8,679,353 B2 | 3/2014 | Winsness | |
| 8,747,106 B2 | 6/2014 | DeLine et al. | |
| 8,841,469 B2 | 9/2014 | Shepperd et al. | |
| 8,962,059 B1 | 2/2015 | Froderman et al. | |
| 9,255,239 B1 | 2/2016 | Wiese | |
| 9,399,750 B1 | 7/2016 | Wiese | |
| 2003/0008961 A1 | 1/2003 | Uematsu | |
| 2006/0128816 A1 | 6/2006 | Cheng et al. | |
| 2008/0176298 A1 | 7/2008 | Randhava et al. | |
| 2010/0159547 A1 | 6/2010 | Faulconbridge et al. | |
| 2010/0186767 A1 | 7/2010 | Martin | |
| 2010/0331580 A1 | 12/2010 | Ridgley | |
| 2011/0283602 A1 | 11/2011 | Gallop et al. | |
| 2012/0125859 A1 | 5/2012 | Collins et al. | |
| 2012/0244590 A1 | 9/2012 | Lee | |
| 2012/0245370 A1 | 9/2012 | Sheppard et al. | |
| 2014/0073038 A1 | 3/2014 | Winsness | |
| 2014/0171670 A1* | 6/2014 | Jenkins | C11B 13/00 554/19 |
| 2014/0275589 A1 | 9/2014 | Blankenburg et al. | |
| 2015/0184112 A1 | 7/2015 | Lewis et al. | |
| 2015/0284659 A1* | 10/2015 | Young | C11B 3/006 554/204 |
| 2016/0340609 A1* | 11/2016 | Bingeman | C11B 13/00 |

FOREIGN PATENT DOCUMENTS

| | | |
|---|---|---|
| JP | 51-128912 A | 11/1976 |
| WO | WO 97/31997 A1 | 9/1997 |
| WO | WO 97/35557 A1 | 10/1997 |
| WO | WO 2007/030341 A2 | 3/2007 |
| WO | WO 2015/009485 A1 | 1/2015 |
| WO | WO 2015/057191 A1 | 4/2015 |

OTHER PUBLICATIONS

International Search Report and the Written Opinion of International Application No. PCT/US2015/068023, mailed May 5, 2016, 1-10 pages.
Do, Linh et al., 'Aqueous Extended-Surfactant Based Method for Vegetable Oil Extraction: Proof of Concept,' J Am Oil Chem Soc (2010) 87:1211-1220.
Kadioglu, Sezin et al., 'Surface-Based Oil Extraction of Corn Germ,' J Am Oil Chem Soc (2011) 88:863-869.
Kleiner, M., Thermal Conductivity Measurements of Thin Silicon Dioxide Films in Integrated Circuits, 1996, IEEE Transactions on the electron devices, vol. 43, No. 9, pp. 1602-1609.
Klinkesorn, Utai et al., 'Stability and rheology of corn oil-in-water emulsions containing maltodextrin,' Food Research International 37 (2004) 851-859.
Liggett, R. et al., 'Corn Steep Liquor in Microbiology,' Bacteriol Rev (1948) vol. 12, 297-311.
P&G Professional Joy Manual Pot and Pan Detergent [95121677], 'Material Safety Data Sheet,' P&G Household Care Fabric & Home Care Innovation Center, (2009-2010) 1-5.
Wang, Hui et al., 'Effect of Low-Shear Extrusion on Corn Fermentation and Oil Partition,' J. Agric. Food Chern. 2009; 57, 2302-2307.
U.S. Appl. No. 61/454,634, filed Mar. 31, 2011, 12 pages.
Form PCT/ISA/206—Invitation to Pay Additional Fees of International Application No. PCT/US2015/068023, dated Feb. 17, 2016.

* cited by examiner

*Primary Examiner* — Yate K Cutliff
(74) *Attorney, Agent, or Firm* — Seyfarth Shaw LLP

(57) ABSTRACT

Provided is a method for recovering oil from corn in an ethanol production process. The method comprises applying an alkoxylated glycerine ester of formula (I) to a corn-based product obtained from an ethanol production process.

10 Claims, No Drawings

USE OF ALKOXYLATED MONO- AND DIGLYCERIDES FOR CORN OIL RECOVERY

BACKGROUND OF THE INVENTION

Corn oil has gained considerable momentum for use as a biodiesel. Corn oil also is used extensively in animal (e.g., poultry, swine, and cattle) feed. Thus the ability to obtain oil as part of the ethanol recovery process from corn is more important than ever. For every bushel of corn, there is approximately 1.5 pound of corn oil available for extraction.

To obtain ethanol and oil, a corn kernel typically undergoes fractionation to separate the various parts of the kernel: endosperm, germ, and the outer skin known as bran. To produce ethanol, starch contained in the endosperm must be fermented, whereas the corn's germ contains about 85% of the kernel's oil. Corn oil typically is obtained by pressing fractionated corn particles and extracting the oil with a solvent, such as hexane. To isolate the corn oil, the solvent is evaporated, recovered, and recycled. However, this method can be undesirable with respect to the use of organic solvent and the percent oil recovery is not very high.

Thus there remains a need to improve corn processing to improve the oil yield of the process and/or avoid the use of organic solvent.

BRIEF SUMMARY OF THE INVENTION

The invention provides a method for recovering oil from corn in ethanol production by applying at least one compound of formula (I),

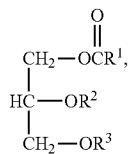

wherein
  $R^1$ is a fatty acid residue,
  $R^2$ and $R^3$ are the same or different and each is a polyalkoxy group or $-C(O)R^1$, provided that at least one of $R^2$ and $R^3$ is a polyalkoxy group
to a corn-based product obtained from an ethanol production process.

DETAILED DESCRIPTION OF THE INVENTION

The present invention is directed to a method comprising the step of contacting at least one alkoxylated mono- or diglyceride to a corn-based product obtained from an ethanol production process to improve the separation of corn oil from at least one process stream (e.g., whole stillage and/or thin stillage and/or syrup) generated as a by-product in corn to ethanol production. The process involves extraction of oil from milled corn and residues from the fermentation step, including thick stillage, distillers wet grain, distillers dry grain and distillers dry grains, with solubles. The method can be used in either a wet milling process or a dry milling process for ethanol production. Preferably the method is employed in a dry-milling process.

In particular, the invention provides a process for extracting corn oil from corn in an ethanol production process by obtaining a corn-based product from the ethanol production process and applying at least one compound of formula (I),

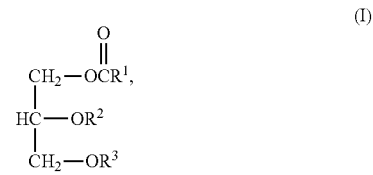

wherein
  $R^1$ is a fatty acid residue,
  $R^2$ and $R^3$ are the same or different and each is a polyalkoxy group or $-C(O)R^1$, provided that at least one of $R^2$ and $R^3$ is a polyalkoxy group,
to the corn-based product. The applying step can take place by any suitable method, including stirring (e.g., mechanical stirring), shearing, shaking, static mixing, whisking, mashing, vibrating, circulating, flowing, boiling, spraying, or any combination thereof.

Typically the combined mixture of the corn-based product and the compound of formula (I) are heated during the applying step. The temperature should be sufficient to facilitate the recovery of oil from the corn-based product. For example, the mixture can be heated to 30-110° C. (e.g., 40-100° C., 50-100° C., 60-90° C., 70-90° C., 80-90° C.). In some embodiments, the mixture is heated to about 90° C., about 85° C., about 80° C., or about 75° C. Preferably, the mixture is heated to about 85° C.

The applying step can take place over any suitable time period that is appropriate for maximizing the recovery of corn oil. Typically, the applying step will be at least 1 minute (e.g., at least 2 minutes, at least 3 minutes, at least 5 minutes, at least 8 minutes, at least 10 minutes, at least 15 minutes), but generally less than 120 minutes (e.g., less than 90 minutes, less than 75 minutes, less than 60 minutes, less than 45 minutes, less than 30 minutes, less than 20 minutes, less than 15 minutes, less than 12 minutes, less than 10 minutes, less than 8 minutes, less than 5 minutes). These suggested lower and upper limits with respect to the length of time can be used in any combination to describe the range of the second temperature, or can be used singly to describe an open-ended range.

After the compound of formula (I) has been applied to the corn-based product, the corn oil can be quantified, isolated, and/or purified by any suitable technique (e.g., centrifugation, physical extraction, solvent extraction, super critical fluid extraction, filtration, dissolution, fractionation, or any combination of these techniques).

The corn can be any type of corn that undergoes processing to obtain ethanol and/or oil. For example, the corn can be dent corn (also known as field corn), sweet corn, flint corn, popcorn, waxy corn (also known as maize), high oil corn, or hybrids thereof. Typically the corn will be dent corn.

In a typical dry milling process, corn oil passes through the fermentation and distillation processes and can be found in the thick (whole) stillage product, which is typically further separated into thin stillage and wet grains (wet cake) The thin stillage is processed to concentrate the composition into syrup. At this stage of the process, about half of the oil is in the distillers wet grain (DWG) and the other half is found in the syrup. The concentrated syrup can be processed to separate the oil from the syrup; the remaining syrup can be combined with the distillers wet grain (DWG) and dried to form dry distillers grain (DDG). The method can be performed at any suitable point of the ethanol production process, including after the corn has been milled (e.g., before fermentation), after thick stillage has been formed, after thin stillage has been formed, after distillers wet grains (DWG) (wet cake) have been formed, and/or after distillers dry grains with solubles (DDGS) have been formed. As it will be appreciated, the method can be performed at one point of the ethanol production process or at multiple points of the ethanol production process. Moreover, if necessary, the method can be repeated one or more times to increase the percent recovery of oil from a desired corn-based product.

In view of the flexibility of the method, the corn-based product can be in one or more forms. For example, the corn-based product can be milled corn, thick stillage, thin stillage, syrup, distillers wet grain (DWG), distillers dry grain (DDG), distillers dry grains with soluble (DDGS), or any combination thereof. In an aspect, the compound of formula (I) is applied to a thick (whole) stillage, thin stillage, or syrup corn-based product. Preferably, the corn-based product is thin stillage.

The method described herein generally provides an increase in percent corn oil recovery relative to the absence of the at least one alkoxylated mono- or diglyceride. In some aspects, the percent corn oil recovery is at least 3% or more (e.g., at least 3.5% or more, at least 4% or more, at least 4.5% or more, at least 5% or more, at least 5.5% or more, at least 6% or more, at least 6.5% or more, at least 7% or more).

The compound of formula (I) to be applied to the corn-based product is an alkoxylated glycerine ester (e.g., ethoxylated mono- or diglyceride), such as alkoxylated glycerine esters derived from one or more fatty acid residues. In the compound of formula (I), $R^1$ and optionally one of $R^2$ and $R^3$ comprise a fatty acid residue that can be saturated or unsaturated and either straight chain or branched. Fatty acids typically have an even number of carbon atoms and can range from 4 to 28 carbons. If the fatty acid residue is unsaturated, the double bond(s) can have either a cis or trans configuration. Suitable fatty acid residues include residues of butyric acid, caprylic acid, oleic acid, linoleic acid, linoeladic acid, linolenic acid, stearic acid, palmitic acid, palmitoleic acid, sapienic acid, myristic acid, myristoleic acid, lauric acid, arachidic acid, arachidonic acid, behenic acid, lignoceric acid, cerotic acid, erucic acid, elaidic acid, vaccenic acid, eicosapentaenoic acid, docosahexaenoic acid, and combinations thereof. In an embodiment, the fatty acid residue is a residue of oleic acid, lauric acid, stearic acid, palmitic acid, or a combination thereof.

In some embodiments, $R^1$ is a saturated or unsaturated, straight or branched alkyl $C_{7-22}$ chain (e.g., a $C_{8-22}$ chain, a $C_{10-20}$ chain, a $C_{12-18}$ chain, or a $C_{14-18}$ chain). In other words, $R^1$ preferably comprises at least 7 carbon atoms (e.g., at least 8 carbon atoms, at least 10 carbon atoms, at least 12 carbon atoms, at least 14 carbon atoms, at least 16 carbon atoms, at least 18 carbon atoms, or at least 20 carbon atoms) and less than 22 carbon atoms (e.g., less than 20 carbon atoms, less than 18 carbon atoms, less than 16 carbon atoms, less than 14 carbon atoms, less than 12 carbon atoms, less than 10 carbon atoms, or less than 8 carbon atoms). These suggested lower and upper limits with respect to the number of carbons in the alkyl chain of $R^1$ can be used in any combination to define a close-ended range.

$R^2$ and $R^3$ are the same or different and each is a polyalkoxy group or —C(O)$R^1$, provided that at least one of $R^2$ and $R^3$ is a polyalkoxy group. In some embodiments, both $R^2$ and $R^3$ are a polyalkoxy group. In other embodiments, one of $R^2$ and $R^3$ is —C(O)$R^1$ and the other is a polyalkoxy group. When $R^2$ and/or $R^3$ is —C(O)$R^1$, the definition of $R^1$ is the same as set forth above. While the saturated or unsaturated, straight or branched alkyl chain of $R^1$ and either $R^2$ or $R^3$ can be identical, the alkyl chains of these substituents do not necessarily need to be the same. In a preferred embodiment, the alkyl chains of $R^1$ and either $R^2$ or $R^3$ are different.

The polyalkoxy group can be based on any suitable carbon range, e.g., $C_{2-6}$, $C_{2-5}$, $C_{2-4}$, $C_{2-3}$, $C_3$, or $C_2$. For example, the polyalkoxy group can be polyethoxy (e.g., —(CH$_2$CH$_2$O)$_n$H), polypropoxy (e.g., —(CH$_2$CH(CH$_3$)O)$_n$H or —(CH(CH$_3$)CH$_2$O)$_n$H), or a combination thereof, in which n is 2-60 (e.g., n is at least 10, at least 15, at least 20, at least 25, at least 30, at least 35, at least 40, at least 45, at least 50, at least 55, or about 60 and/or n is less than 60, less than 55, less than 50, less than 45, less than 40, less than 35, less than 30, less than 25, less than 20, less than 15, less than 10, or less than 5). These suggested lower and upper limits with respect to n can be used in any combination to define a close-ended range. In an embodiment, the polyalkoxy group is a polyethoxy group comprising up to 60 moles of ethylene oxide.

The polyalkoxy group can comprise 2-65 moles alkoxylation per compound of formula (I). For example, the polyalkoxy group can comprise at least 2 moles (e.g., at least 4 moles, at least 8 moles, at least 10 moles, at least 15 moles, at least 20 moles, at least 22 moles, at least 23 moles, at least 25 moles, at least 28 moles, at least 30 moles, at least 32 moles, at least 34 moles, at least 36 moles, at least 38 moles, at least 40 moles, at least 45 moles, at least 50 moles, at least 55 moles, at least 60 moles, or at least 62 moles) and less than 65 moles (e.g., less than 62 moles, less than 60 moles, less than 55 moles, less than 50 moles, less than 45 moles, less than 40 moles, less than 38 moles, less than 36 moles, less than 34 moles, less than 32 moles, less than 30 moles, less than 28 moles, less than 25 moles, less than 23 moles, less than 22 moles, less than 20 moles, less than 15 moles, less than 10 moles, less than 8 moles, or less than 4 moles) alkoxylation (e.g., ethoxylene) per compound of formula (I). These suggested lower and upper limits with respect to the moles of alkoxylation per compound of formula (I) can be used in any combination to define a close-ended range. In some aspects, the polyalkoxy group comprises 20-25 moles (e.g., 20 moles, 21 moles, 22 moles, 23 moles, 24 moles, and 25 moles) or 25-45 moles (e.g., 30 moles, 35 moles, and 40 moles) alkoxylation (e.g., ethoxylene) per compound of formula (I).

The molecular weight of the alkoxylated portion is not particularly limited. Preferably, the molecular weight of the alkoxylated (e.g., ethoxylated) portion is set so as to provide the compound of formula (I) as a liquid. For example, the number, weight, or volume average molecular weight can be at least about 200 g/mol (e.g., at least about 300 g/mol, at least about 400 g/mol, at least about 500 g/mol, at least about 800 g/mol, at least about 1,000 g/mol, at least about 1,500 g/mol, at least about 2,000 g/mol) and/or up to about 10,000 g/mol (e.g., up to about 9,000 g/mol, up to about 8,000 g/mol, up to about 7,000 g/mol, up to about 6,000 g/mol, up to about 5,000 g/mol, up to about 4,000 g/mol, up to about 3,000 g/mol, up to about 2,000 g/mol, or up to about 1,000 g/mol). These suggested lower and upper limits with respect to the number, weight, or volume average molecular weight can be used in any combination to describe the polymer molecular weight range (e.g., about 200 to about 10,000 g/mol, about 300 g/mol to about 5,000 g/mol, and about 1,000 to about 2,000 g/mol, etc.).

While the compound of formula (I) defines a single compound, in some aspects, more than one compound of formula (I) can be used in the form of a mixture of compounds defined by formula (I). Typically, the mixture of compounds will be a combination of one or more alkoxylated monoglycerides and one or more alkoxylated diglycerides. The ratio of monoglycerides to diglycerides in the mixture can be any suitable amount (e.g., ranging from 1/99 to 99/1, including 5/95 to 95/5, 10/90 to 90/10, 15/85 to 85/15, 20/80 to 80/20, 25/75 to 75/25, 30/70 to 70/30, 35/65 to 65/35, 40/60 to 60/40, 45/55 to 55/45, and 50/50). Specific ratios of monoglycerides to diglycerides include, for example, 28/72 and 42/58. In some embodiments, the mixture of compounds defined by formula (I) includes ethoxylated $C_{8-22}$ mono- and diglycerides (e.g., $C_{14-22}$ mono- and diglycerides) or a mixture of laurate, oleate, stearate, and/or palmitate partial esters of glycerine.

The compound of formula (I) or a mixture thereof can be synthesized by any suitable method or purchased commercially. For example, a compound of formula (I) can be produced by saponifying and/or transesterifying a glyceride material, such as canola oil, cottonseed oil, corn oil, poppyseed oil, sunflower oil, safflower oil, linseed oil, peanut oil, or soybean oil. Production methods of ethoxylated monoglycerides are known in the art. See, e.g., U.S. Pat. No. 3,433,645, the entire disclosure of which is incorporated by reference.

Commercially available compounds of formula (I) or a mixture thereof include, e.g., LUMULSE™ products (Lambent Technologies, Gurnee, Ill.) and ALDOSPERSE™ products (Lonza, Allendale, N.J.). Specific products include LUMULSE™ POE (20) GMS K and ALDOSPERSE™ MS-20 KFG.

If desired, the at least one compound of formula (I) can be used in combination with one or more additional components as described herein.

In some embodiments, the at least one compound of formula (I) is used in combination with any suitable liquid oil. Typically the oil should be of a grade that is certified GRAS (generally regarded as safe), however, not all instances require such grade. Suitable oils include a petroleum distillate (e.g., white mineral oil, pale oil, paraffinic oil, and combinations thereof), a vegetable oil (e.g., soybean oil, castor oil, canola oil, rapeseed oil, linseed oil, sunflower oil, safflower oil, cottonseed oil, and combinations thereof), or a combination thereof. Mineral oil (also known as white oil, liquid paraffin, pariffinum liquidum, liquid petroleum, and baby oil) is especially preferred.

In any of the foregoing embodiments, the at least one compound of formula (I) is used in combination with at least one propylene glycol ester of a fat and/or a fatty acid is a monoester, a diester, or a combination thereof. The propylene glycol ester can have the following structure based on 1,2-propanediol:

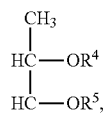

wherein $R^4$ and $R^5$ are the same or different and each is H, a fat, or a fatty acid, provided that at least one of $R^4$ and $R^5$ is a fat or fatty acid. Typically, the propylene glycol ester of a fat and/or a fatty acid is used as a mixture of at least one propylene glycol ester of a fat and at least one propylene glycol ester of a fatty acid. In addition, the propylene glycol ester of fat and/or a fatty acid can include residual monoglycerides, diglycerides, and/or glycerol in addition to the at least one propylene glycol ester of fat and/or a fatty acid.

In an aspect, the fat and/or fatty acid are edible. In an embodiment, the propylene glycol ester of fat and/or a fatty acid is of a grade described in 21 C.F.R. §172.856. Suitable fats include a vegetable oil (e.g., coconut oil, soybean oil, castor oil, canola oil, rapeseed oil, linseed oil, sunflower oil, safflower oil, cottonseed oil, and combinations thereof). The fatty acid residue can be saturated or unsaturated (e.g., either a cis or trans configuration), straight chain or branched, and have 4 to 28 carbons. Suitable fatty acid residues include residues of butyric acid, caprylic acid, oleic acid, linoleic acid, linoelaidic acid, linolenic acid, stearic acid, palmitic acid, palmitoleic acid, sapienic acid, myristic acid, myristoleic acid, lauric acid, arachidic acid, arachidonic acid, behenic acid, lignoceric acid, cerotic acid, erucic acid, elaidic acid, vaccenic acid, eicosapentaenoic acid, docosahexaenoic acid, and combinations thereof.

Examples of the at least one propylene glycol ester of a fat and/or fatty acid include propylene glycol isostearate, propylene glycol laurate, propylene glycol myristate, propylene glycol oleate, propylene glycol dicaprylate, propylene glycol dicaprylate/dicaprate, propylene glycol dicocoate, propylene glycol dipelargonate, propylene glycol oleate, propylene glycol dicaprate, propylene glycol diisostearate, and propylene glycol dilaurate.

The at least one propylene glycol ester of fat and/or a fatty acid can be prepared by any suitable method, including direct esterification of propylene glycol with a fatty acid or transesterification of propylene glycol with fat (e.g., an oil).

In any of the foregoing embodiments, the at least one compound of formula (I) is used in combination with a metal oxide. Typically, a suitable metal oxide is any compound comprising at least one metal atom and at least one anion of oxygen that has an oxidation state of −2. In some aspects, the metal oxide is selected from the group consisting of silicon dioxide (including fumed silica, amorphous silica, precipitated silica, hydrophilic silica, and hydrophobic silica), titanium dioxide, zinc oxide, iron oxide, aluminum oxide, cerium oxide, zirconium oxide, and a combination thereof. Preferably the metal oxide is silicon dioxide.

The average particle size of the metal oxide is not particularly limited and can range from 1 nm to 10 μm. For example, the average particle size of the metal oxide can be at least 1 nm (e.g., at least 10 nm, at least 30 nm, at least 50 nm, at least 75 nm, at least 100 nm, at least 200 nm, at least 300 nm, at least 400 nm, at least 500 nm, at least 600 nm, at least 700 nm, at least 800 nm, at least 900 nm, at least 1 μm, at least 2 μm, at least 3 μm, at least 4 μm, at least 5 μm, at least 6, at least 7 μm, at least 8 μm, or at least 9 μm). The average particle size of the metal oxide typically is less than 10 μm (e.g., less than 9 μm, less than 8 μm, less than 7 μm, less than 6 μm, less than 5 μm, less than 4 μm, less than 3 μm, less than 2 μm, less than 1 μm, less than 900 nm, less than 800 nm, less than 700 nm, less than 600 nm, less than 500 nm, less than 400 nm, less than 300 nm, less than 200 nm, less than 100 nm, less than 75 nm, less than 50 nm, less than 30 nm, less than 10 nm, or less than 1 nm). These suggested lower and upper limits with respect to the average particle size of the metal oxide can be used in any combination to define a close-ended range.

In any of the foregoing embodiments, the at least one compound of formula (I) is used in combination with a triglyceride that corresponds to the alkoxylated mono- or diglyceride of formula (I) (e.g., the oleate ester made from canola oil). The upper limit of the amount of triglyceride that can be present is not particularly limited, but can be up to 5 wt % (e.g., less than 4.5 wt %, less than 4 wt %, less than 3.5 wt %, less than 3 wt %, less than 2.5 wt %, less than 2 wt %, less than 1.5 wt %, less than 1 wt %, or less than 0.5 wt %).

In any of the foregoing embodiments, the at least one compound of formula (I) is used in combination with glycerine in an amount up to 10 wt % (e.g., less than 9 wt %, less than 8 wt %, less than 7 wt %, less than 6 wt %, less than 5 wt %, less than 4 wt %, less than 3 wt %, less than 2 wt %, or less than 1 wt %).

In any of the foregoing embodiments, the at least one compound of formula (I) is used in combination with one or more glycerine esters (e.g., a monoglyceride, a diglyceride, a triglyceride, or a combination thereof) in an amount up to 5 wt % (e.g., less than 4.5 wt %, less than 4 wt %, less than 3.5 wt %, less than 3 wt %, less than 2.5 wt %, less than 2 wt %, less than 1.5 wt %, less than 1 wt %, or less than 0.5 wt %). The fatty acid residues that form the glycerine ester are as described herein.

In any of the foregoing embodiments, the at least one compound of formula (I) is used in combination with a diol, such as propylene glycol or ethylene glycol, in an amount up to 12 wt % (e.g., less than 10 wt %, less than 9 wt %, less than 8 wt %, less than 7 wt %, less than 5 wt %, less than 2 wt %, less than 1 wt %, or less than 0.5 wt %).

In one aspect of the invention, the at least one compound of formula (I) is used substantially without the presence of a component derived from a sorbitol, a sorbitan, or isosorbide. As used herein, "substantially without the presence of a component derived from a sorbitol, a sorbitan, or isosorbide" refers to a formulation that contains less than about 5 wt % of a component derived from a sorbitol, a sorbitan, or isosorbide. For example, less than about 4 wt %, less than about 3 wt %, less than about 2 wt %, less than about 1 wt %, less than about 0.5 wt %, or less than about 0.1 wt % by weight of a component derived from a sorbitol, a sorbitan, or isosorbide is present in combination with at least one compound of formula (I). In some embodiments of the method, a component derived from a sorbitol, a sorbitan, or isosorbide is completely absent. In some embodiments, the method does not comprise the use of a polysorbate (e.g., polysorbate 20, polysorbate 40, polysorbate 60, polysorbate 65, or polysorbate 80), a sorbitan (e.g., sorbitan monolaurate, sorbitan monooleate, or sorbitan monostearate), or sorbitol.

If the compound of formula (I) or a mixture thereof is used in combination with one or more additional components, the at least one compound of formula (I) can be present in any suitable amount. The only caveat is that the amounts of compound of formula (I) or a mixture thereof and any additional components add up to 100 wt %. In some embodiments, the compound of formula (I) or mixture thereof is present in an amount of about 20-75 wt %. Thus, the compound of formula (I) or mixture thereof is present in an amount of at least 20 wt % (e.g., at least 25 wt %, at least about 30 wt %, at least about 35 wt %, at least about 40 wt %, at least about 45 wt %, at least about 50 wt %, at least about 55 wt %, at least about 60 wt %, at least about 65 wt %, or at least about 70 wt %) and less than 75 wt % (e.g., less than about 70 wt %, less than about 65 wt %, less than about 60 wt %, less than about 55 wt %, less than about 50 wt %, less than about 45 wt %, less than about 40 wt %, less than about 35 wt %, or less than about 30 wt %). These suggested lower and upper limits with respect to the amount of a compound of formula (I) or a mixture thereof can be used in any combination to define a close-ended range. For example, the composition can comprise about 25-70 wt %, about 35-55 wt %, about 40-55 wt %, about 40-50 wt %, about 40-65 wt %, or about 50 wt % of a compound of formula (I) or a mixture thereof.

If present, an oil or a combination of oils can be used in any suitable amount, such as about 25-74 wt %. Thus, the total amount of oil is present in an amount of at least 25 wt % (e.g., at least about 30 wt %, at least about 35 wt %, at least about 40 wt %, at least about 45 wt %, at least about 50 wt %, at least about 55 wt %, at least about 60 wt %, at least about 65 wt %, or at least about 70 wt %) and less than 74 wt % (e.g., less than about 70 wt %, less than about 65 wt %, less than about 60 wt %, less than about 55 wt %, less than about 50 wt %, less than about 45 wt %, less than about 40 wt %, less than about 35 wt %, or less than about 30 wt %). These suggested lower and upper limits with respect to the amount of oil can be used in any combination to define a close-ended range. For example, the composition can comprise about 30-70 wt %, about 25-63 wt %, about 25-61 wt %, about 30-60 wt %, about 41-63 wt %, about 43-61 wt %, about 45-55 wt %, about 45-50 wt %, or about 46-48 wt % of an oil or a combination of oils.

If present, the propylene glycol ester of fat and/or a fatty acid or a combination of propylene glycol ester of fats and fatty acids can be used in any suitable amount, such as about 25-74 wt %. Thus, the total amount of the propylene glycol ester of fat and/or a fatty acid is present in an amount of at least 25 wt % (e.g., at least about 30 wt %, at least about 35 wt %, at least about 40 wt %, at least about 45 wt %, at least about 50 wt %, at least about 55 wt %, at least about 60 wt %, at least about 65 wt %, or at least about 70 wt %) and less than 74 wt % (e.g., less than about 70 wt %, less than about 65 wt %, less than about 60 wt %, less than about 55 wt %, less than about 50 wt %, less than about 45 wt %, less than about 40 wt %, less than about 35 wt %, or less than about 30 wt %). These suggested lower and upper limits with respect to the amount of the propylene glycol ester of fat and/or a fatty acid can be used in any combination to define a close-ended range. For example, the composition can comprise about 30-70 wt %, about 25-63 wt %, about 25-61 wt %, about 30-60 wt %, about 41-63 wt %, about 43-61 wt %, about 45-55 wt %, about 45-50 wt %, or about 46-48 wt % of at least one propylene glycol ester of fat and/or a fatty acid.

If present, the metal oxide or a combination thereof can be used in any suitable amount, such as about 1-20 wt %. Thus, the total amount of metal oxide is present in an amount of at least 1 wt % (e.g., at least about 2 wt %, at least about 3 wt %, at least about 5 wt %, at least about 8 wt %, at least about 10 wt %, at least about 15 wt %, or at least about 18 wt %) and less than 20 wt % (e.g., less than about 18 wt %, less than about 15 wt %, less than about 10 wt %, less than about 8 wt %, less than about 5 wt %, less than about 3 wt %, less than about 2 wt %, or less than about 1 wt %). These suggested lower and upper limits with respect to the amount of metal oxide can be used in any combination to define a close-ended range. For example, the composition can comprise about 2-18 wt %, 3-15 wt %, about 2 wt %, about 10 wt %, about 15 wt %, or about 20 wt % of metal oxide or a combination thereof.

A formulation comprising at least one compound of formula (I) and one or more additives described herein can be prepared by any suitable method. In a specific example, a metal oxide (e.g., silicon dioxide) is pre-mixed in a portion of an oil (e.g., mineral oil) and/or at least one propylene glycol ester of fat and/or a fatty acid. The compound of formula (I) or a mixture thereof is then blended with the metal oxide/oil (or propylene glycol ester) premix, and the remaining portion of oil (or propylene glycol ester). The resulting composition is mixed well, optionally heated (e.g., up to 150° C., up to 130° C., up to 120° C., up to 110° C., up to 100° C., etc.), processed through a homogenizer to provide a uniform (or nearly uniform) particle size, and filtered.

In a preferred embodiment, the at least one compound of formula (I) or a formulation comprising such compound is a liquid at room temperature. Accordingly, in such embodiments, the at least one compound of formula (I) or a formulation comprising such compound should not be a gel, solid, or semi-solid at room temperature.

The invention is further illustrated by the following embodiments.

(1) A method for recovering oil from corn in ethanol production, the method comprising applying a compound of formula (I),

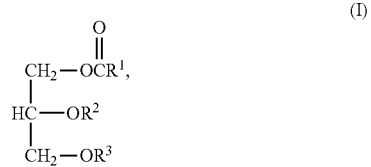

wherein $R^1$ is a fatty acid residue; $R^2$ and $R^3$ are the same or different and each is a polyalkoxy group or —C(O)$R^1$, provided that at least one of $R^2$ and $R^3$ is a polyalkoxy group, to a corn-based product from an ethanol production process.

(2) The method of embodiment (1), wherein the corn-based product is milled corn, thick stillage, thin stillage, syrup, distillers wet grain (DWG), distillers dry grain (DDG), distillers dry grains with soluble (DDGS), or any combination thereof.

(3) The method of embodiment (1) or embodiment (2), wherein the applying step is performed after the corn has been milled, after thick stillage has been formed, after thin stillage has been formed, after distillers wet grains (DWG) have been formed, and/or after distillers dry grains with solubles (DDGS) have been formed.

(4) The method of any one of embodiments (1)-(3), wherein $R^1$ is a saturated or unsaturated, straight or branched alkyl $C_{7-22}$ chain.

(5) The method of any one of embodiments (1)-(4), wherein $R^1$ is a saturated or unsaturated, straight or branched alkyl $C_{8-22}$ chain.

(6) The method of any one of embodiments (1)-(5), wherein both $R^2$ and $R^3$ are a polyalkoxy group.

(7) The method of any one of embodiments (1)-(5), wherein one of $R^2$ and $R^3$ is —C(O)$R^1$ and the other is a polyalkoxy group.

(8) The method of any one of embodiments (1)-(7), wherein the polyalkoxy group is a polyethoxy group comprising up to 65 moles of ethylene oxide.

(9) The method of any one of embodiments (1)-(8), wherein the fatty acid residue is a residue of lauric acid, oleic acid, stearic acid, palmitic acid, or a combination thereof.

(10) The method of any one of embodiments (1)-(9), wherein more than one compound of formula (I) forms a mixture of compounds defined by formula (I) that is applied to the corn-based product.

(11) The method of embodiment (10), wherein the mixture of compounds defined by formula (I) comprises ethoxylated $C_{8-22}$ mono- and diglycerides.

(12) The method of embodiment (10) or embodiment (11), wherein the mixture of compounds defined by formula (I) comprises alkoxylated mono- and diglycerides, wherein the ratio of monoglycerides:diglycerides ranges from 20/80 to 80/20.

The following example further illustrates the invention but, of course, should not be construed as in any way limiting its scope.

EXAMPLE

This example demonstrates a method of corn oil recovery from a corn-based product using an ethanol production process in an embodiment of the invention.

A sample of corn syrup was added to a beaker containing an amount of defoamer that is either (i) ethoxylated mono- and diglycerides (e.g., glycerol monooleate (GMO) (inventive)) or (ii) polysorbate 80 (T-I 80) (comparative). A stir bar was added, and the defoamer/corn syrup mixture was placed on a hot plate. The mixture was agitated sufficiently to form a vortex, heated to 85° C., and held at that temperature for 5 minutes.

After heating for 5 minutes, the beaker was removed and the contents were poured into a small centrifuge tube with the defoamer/corn oil syrup mixture to about the top of the tube. The tube was not overfilled, so that the top of the sample was viewable in the centrifuge tube when the cap of the centrifuge tube is on.

The vials were placed in a refrigerator to lower the temperature down to about 0° C. (mid 30s ° F.). After cooling, the samples were removed and the temperature at which the material starts to pour was measured.

Next, the tube was centrifuged for 10 minutes. After 10 minutes, the tube was removed from the centrifuge and the contents were left undisturbed for 1 hour.

The total height (mm) of the sample (corn oil portion and the rest of the sample) and the total height (mm) of just the corn oil portion of the sample were measured and recorded. The corn oil portion was measured as a height (mm) and as a % recovery. The results are set forth in the following Table 1.

TABLE 1

| Trial | Product | Amt (ppm) | Corn Sample | Height Corn Oil (mm) | % Corn Oil |
|---|---|---|---|---|---|
| 1 | Polysorbate 80 (T-I 80) | 300 | 5054 | 2 | 1.89 |
| 2 | GMO with 42% monoglycerides and 30 moles ethylene oxide | 300 | 5054 | 3 | 2.83 |
| 3 | Polysorbate 80 (T-I 80) | 500 | 5054 | 2.5 | 2.36 |
| 4 | GMO with 42% monoglycerides and 30 moles ethylene oxide | 500 | 5054 | 3 | 2.83 |
| 5 | GMO with 42% monoglycerides and 35 moles ethylene oxide | 300 | 5054 | 5 | 4.72 |
| 6 | GMO with 42% monoglycerides and 30 moles ethylene oxide | 300 | 5054 | 5 | 4.72 |
| 7 | GMO with 42% monoglycerides and 35 moles ethylene oxide | 300 | 5054 | 5 | 4.76 |
| 8 | Polysorbate 80 (T-I 80) | 500 | 5185 | 5 | 4.67 |
| 9 | GMO with 42% monoglycerides and 35 moles ethylene oxide | 500 | 5185 | 5 | 4.72 |

TABLE 1-continued

| Trial | Product | Amt (ppm) | Corn Sample | Height Corn Oil (mm) | % Corn Oil |
|---|---|---|---|---|---|
| 10 | Polysorbate 80 (T-I 80) | 500 | 5051 | 4 | 3.71 |
| 11 | GMO with 42% monoglycerides and 35 moles ethylene oxide | 500 | 5051 | 3 | 2.78 |
| 12 | Polysorbate 80 (T-I 80) | 500 | 5213 | 5.5 | 5.09 |
| 13 | GMO with 42% monoglycerides and 35 moles ethylene oxide | 500 | 5213 | 4.5 | 4.17 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar references in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for recovering oil from corn in ethanol production, the method comprising applying more than one compound of formula (I) in the form of a mixture of compounds defined by formula (I),

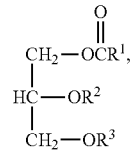

to a corn-based product from an ethanol production process;
wherein
$R^1$ is a fatty acid residue, and $R^2$ and $R^3$ are the same or different and each is a polyalkoxy group or —C(O)$R^1$, provided that at least one of $R^2$ and $R^3$ is a polyalkoxy group;
the mixture of compounds comprise mono- and diglycerides; and
the ratio of monoglycerides:diglycerides ranges from 20/80 to 80/20.

2. The method of claim 1, wherein the corn-based product is milled corn, thick stillage, thin stillage, syrup, distillers wet grain (DWG), distillers dry grain (DDG), distillers dry grains with soluble (DDGS), or any combination thereof.

3. The method of claim 1, wherein the applying step is performed after the corn has been milled, after thick stillage has been formed, after thin stillage has been formed, after distillers wet grains (DWG) have been formed, and/or after distillers dry grains with solubles (DDGS) have been formed.

4. The method of claim 1, wherein $R^1$ is a saturated or unsaturated, straight or branched alkyl $C_{7-22}$ chain.

5. The method of claim 1, wherein $R^1$ is a saturated or unsaturated, straight or branched alkyl $C_{8-22}$ chain.

6. The method of claim 1, wherein both $R^2$ and $R^3$ are a polyalkoxy group.

7. The method of claim 1, wherein one of $R^2$ and $R^3$ is —C(O)$R^1$ and the other is a polyalkoxy group.

8. The method of claim 1, wherein the polyalkoxy group is a polyethoxy group comprising up to 65 moles of ethylene oxide.

9. The method of claim 1, wherein the fatty acid residue is a residue of lauric acid, oleic acid, stearic acid, palmitic acid, or a combination thereof.

10. The method of claim 1, wherein the mixture of compounds defined by formula (I) comprises ethoxylated $C_{8-22}$ mono- and diglycerides.

* * * * *